United States Patent [19]

Ji

[11] Patent Number: 5,775,114
[45] Date of Patent: Jul. 7, 1998

[54] FIGURE 8-FORM THERMODYNAMIC CYCLE AIR CONDITIONER

[76] Inventor: Aming Ji, 37/502 Yuannan Yicun, Shanghai, China

[21] Appl. No.: 718,568

[22] PCT Filed: Feb. 20, 1995

[86] PCT No.: PCT/CN95/00014

§ 371 Date: Nov. 19, 1996

§ 102(e) Date: Nov. 19, 1996

[87] PCT Pub. No.: WO95/27177

PCT Pub. Date: Oct. 12, 1995

[30] Foreign Application Priority Data

Apr. 4, 1994 [CH] Switzerland .................. 94 1 12107.0

[51] Int. Cl.$^6$ ........................................................ F28C 1/00
[52] U.S. Cl. ..................... 62/121; 62/304; 165/104.22
[58] Field of Search ........................ 62/304, 305, 121; 165/104.22

[56] References Cited

U.S. PATENT DOCUMENTS 4,938,035   7/1990   Dinh .................................... 62/305

Primary Examiner—Ronald C. Capossela
Attorney, Agent, or Firm—Morgan & Finnegan, LLP

[57] ABSTRACT

A high lever air conditioner in which a gas energy used as a principal refrigeratory (heating) cycle 8 form cycle consists of a J pipe of air energy heat pump, a J pipe of supercondensation and a heat pump of difference for energy conversion. Theory thermal energy conversion EER thereof can tend to $\infty$, is much greater than Carnot cycle. Actual air conditioner system which needs elements of consumed energy, such as a cycle pump, an energy control device, a fan, etc., has EER value of 20–35. Three difficult problems including high energy consumption, chlorofluorocarbons ($CFC_5$) refrigerant which is contracted, and the lower air quality in conditioned room that is heavily restricted, the development of the present air conditioner may be simultaneously solved.

1 Claim, 7 Drawing Sheets

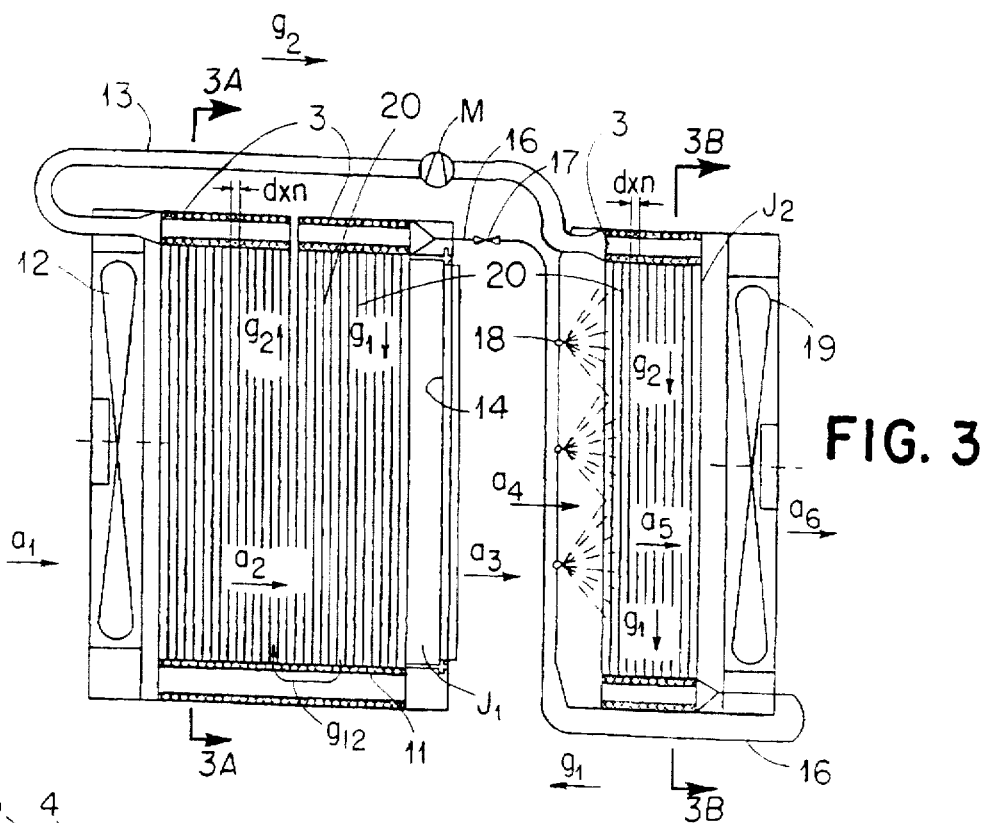
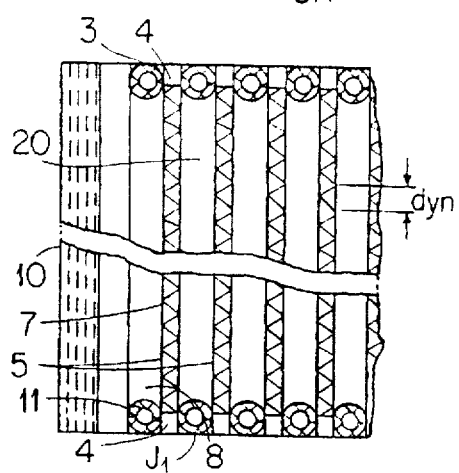
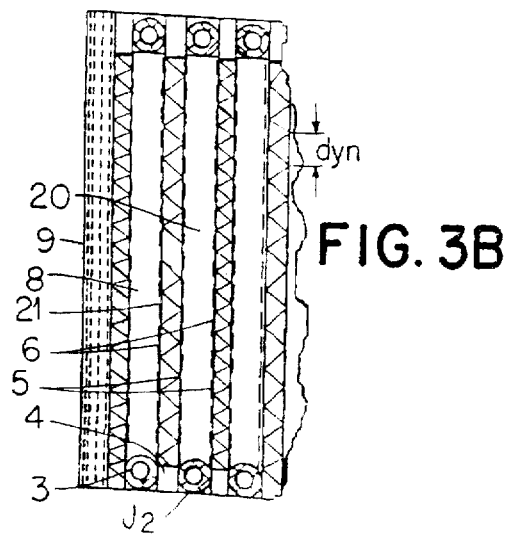
FIG. 3
FIG. 3A
FIG. 3B

FIGURE 8-FORM THERMODYNAMIC CYCLE AIR CONDITIONER

TECHNOLOGY FIELD

This invention relates to refrigeration equipment, and more particularly to an air conditioner heat pump with a low pressure difference, which uses a "differential cold valley pipe" as a heat exchanger and air energy as the primary refrigeration (heating) cycle power, and the like (hereinafter simply called "a figure 8-form machine").

BACKGROUND OF THE TECHNOLOGY

Air energy here refers to the part of energy contained in the ambient air which may be used for refrigeration or heating. The "differential cold valley pipe" (3-pipe) is a plate-type high efficiency heat exchanger featuring a large heat flow rate per unit area and enabling the end temperature difference for heat transmission to approach zero asymptotically. The differential cold valley pipe is set forth by myself in Chinese Application No. 92108350.5 for Invention Patent. Differential cuts a side fluid passageway for a flat metallic heat conducting area or strip in the vertical and another side in the horizontal adiabatic into innumerable micro-isotherm heat exchange zone from high temperature to low one. The fluid to be refrigerated (heated) can always obtain the lowest (highest) temperature point named "cold (hot) valley". Therefore the heat exchange of the fluids on two sides of the heat conducting strip is a differential endothermic process and a differential exothermic one respectively.

The thermodynamic cycle theory for present air conditioners is according to the Carnot and Lorentz cycles which can not utilize air energy efficiently. Next, these heat exchangers are isotherm heat exchangers that do not permit the air that is to be refrigerated (heated) to obtain the lowest (highest) temperature, and the heat transmission temperature difference is common above 5° C. The above two aspects result in that the thermodynamic cycle efficiencies for current air conditioner on the market that are relatively low and in which the EER value can only reach about 3. Therefore, high energy consumption is the most significant deficiency among existing air conditioners.

BRIEF SUMMARY OF THE INVENTION

The energy control of high quality air is the quest, or goal for modern air-conditioners. Energy conversion efficiency in the process of refrigeration is a focus for the subject. This invention first focused on raising the efficiency of the heat exchange and the thermodynamic cycle, and making full use the air energy, in order basically to solve the problems of high energy consumption, bad air quality and limited chlorofluorocarbons (CFCs) use, the three great problems that are faced by the current air conditioner industry.

This invention relates to a figure 8-form thermodynamic cycle for air conditioners with all fresh air (simply called a figure 8-form machine) composed of an air energy heat pump J pipe ($J_1$), a supercondensation J pipe ($J_2$) and an energy transfer heat pump (M) with a low pressure difference, permitting the full utilization of the air energy as the power for a refrigeration cycle. It compares with current vapor compression or absorption air conditioners: $J_1$ corresponds to an evaporator and a generator for concentrating absorbent; $J_2$ corresponds to a condenser and an absorber. The working substance is a mixture composed of an absorbent i and a refrigerant x. As a result, the figure 8-form machine is a dual body that combines vapor compression and absorption refrigeration. The "supercondensation", moreover, means that the working substance condenses under the low temperature and low pressure.

In $J_1$, the outdoor air (air to be refrigerated), under the action of the fan along the ventilating channel of $J_1$, releases heat to the lowest temperature point, or the cold valley temperature $T_0$ from the outdoor temperature $T_k$ with the temperature changing continuously and then is discharged into the interior. In another side of $J_1$, the working substance flow channel with working pressure $P_1$ of the plane-shaped heat conducting strip and the weak solution $g_1$ that is composed of absorbent i and refrigerant x from the cold valley temperature $T_0$ is gradually heated to become a liquid-vapor mixture that is composed of a strong absorbent solution $i_2$ with the outdoor temperature $T_k$. The gasiform refrigerant $x_2$ with superheat temperature $T_k-T_0=\Delta T$ then is pressurized to $P_2$ by M drawn from the outlet of the working substance flow channel via a liquid-vapor conveying pipe, and sent to the inlet of the working substance flow channel of $J_2$.

In $J_2$, the plane-shaped, or flat metallic heat conducting strip of the ventilating channel side adheres to the membrane type evaporating surface with the wet state. The indoor air, or condensation air, for which the wet bulb temperature is $T_4$, under the action of the fan along the flow channel absorbs moisture and heat into $T_3$ (wet bulb) and then discharges to the atmosphere. In another side of the flat or plane-shaped heat conducting strip the working substance flow channel with working pressure $P_2$, the strong absorbent solution $i_2$ and the gasiform refrigerant $x_2$ gradually release heat and condense the weak solution $g_1$ composed of the refrigerant x and the absorbent i with the temperature $T_4$ and then is decompressed to $P_1$ by the throttle valve from the outlet of the working substance flow channel via the liquid conveying pipe and enters the working substance flow channel inlet of $J_1$ . . . which forms a refrigerating cycle.

A more detailed description in conjunction with the accompanying drawing is given as follows.

BRIEF DESCRIPTION OF THE DRAWINGS

FIG. 3 is a schematic diagram of the refrigeration process of the figure 8-form machine.

FIG. 4 shows the TS comparison chart among figure 8-form machines in which

working substance is composed of absorbent and refrigerant, a Carnot refrigerator in which

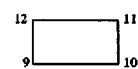

working substance is composed of azeotropic mixed refrigerant or single refrigerant and a Lorentz refrigerator in which

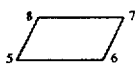

working substance is a non-azeotropic mixed refrigerant.

Figure 4:
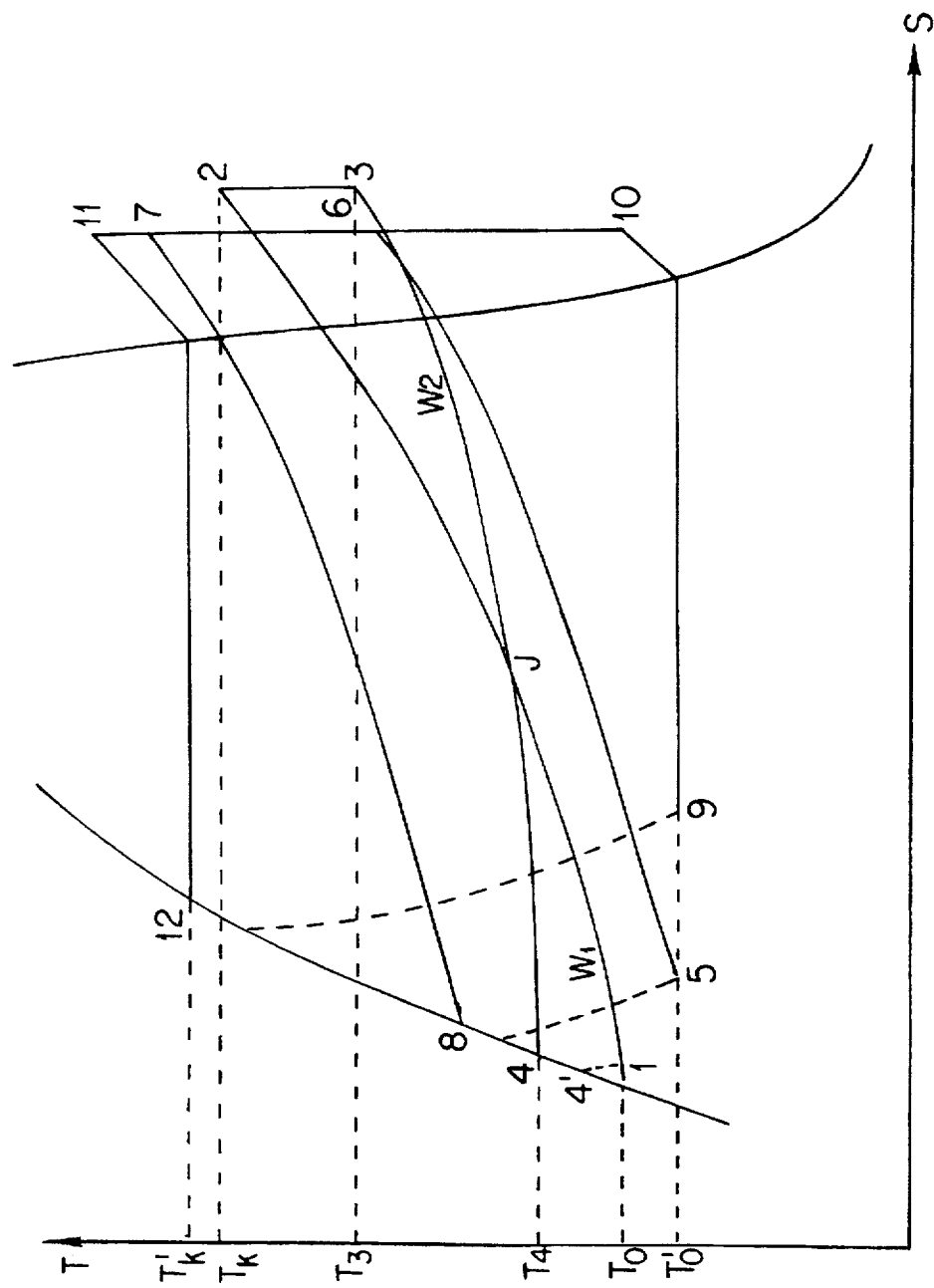
Figure 5:
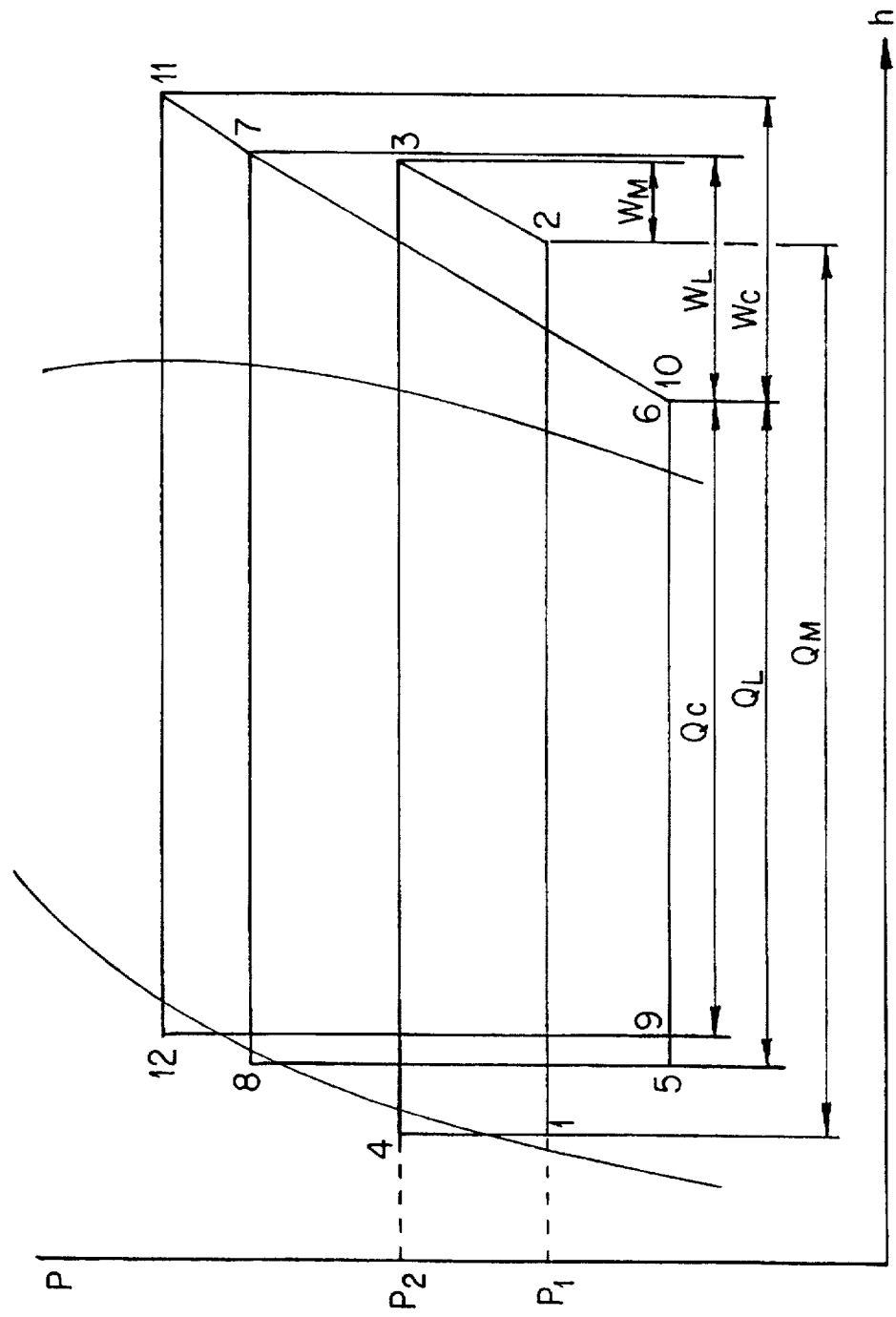

FIG. 5 shows the comparison of FIG. 4 corresponding pressure-enthalpy PH chart.

Figure 6:
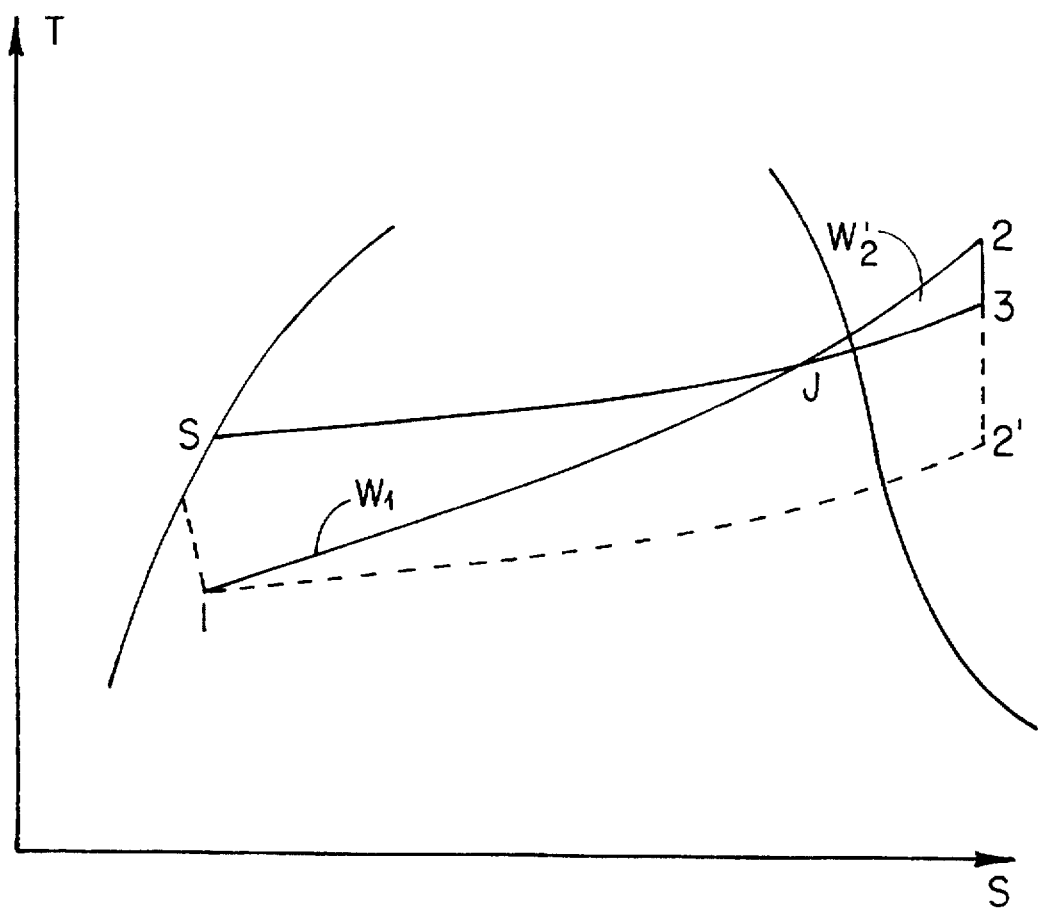

FIG. 6 shows the π-form cycle T-S chart.

Figure 7:
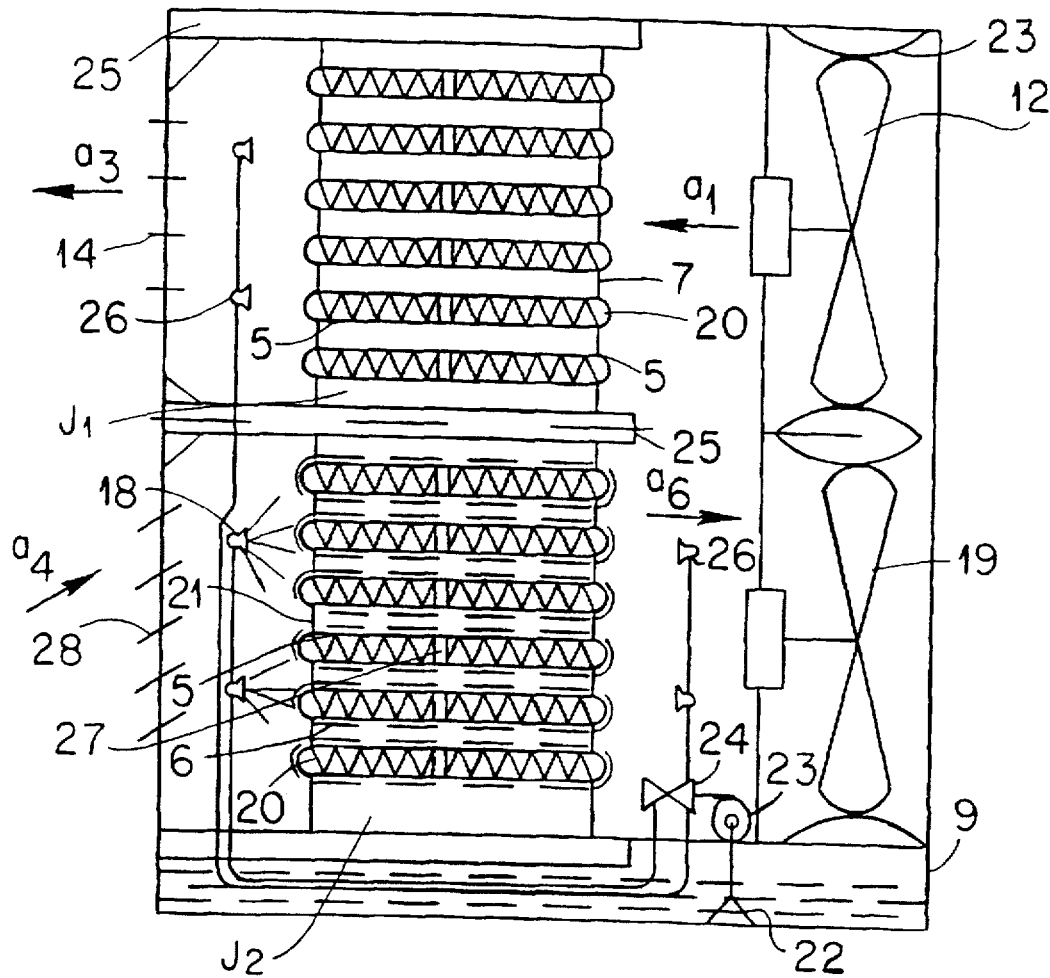

FIG. 7 is the window type figure 8-form machine.

DETAILED DESCRIPTION OF THE PREFERRED EMBODIMENT(S)

Figure 1:
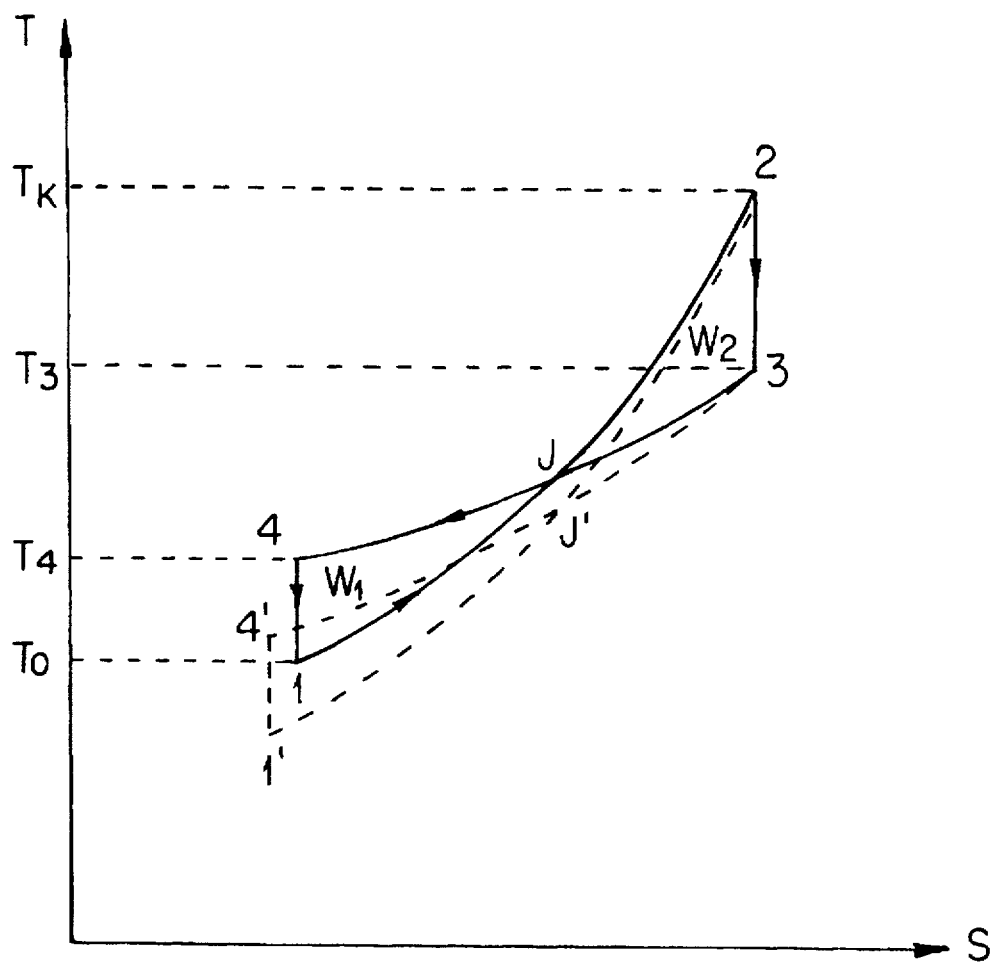
FIG. 1 is the figure 8-form cycle temperature-entropy TS chart.

Please first refer to FIG. 1, it is a figure 8-form cycle temperature-entropy TS chart, in which:

$T_2$ is the hot valley temperature, also the outdoor air dry bulb temperature. $T_2=T_k$ (hot valley being the highest temperature point);

$T_1$ is the cold valley temperature, also the output temperature of cold wind $T_1=T_0$ (cold valley being the lowest temperature point);

$T_4$ is the wet bulb temperature of air in the conditioned room;

$T_3$ is the discharge air wet bulb temperature of the condensation air.

Area I: process 1-J-2 is a process in which the refrigeration working substance pair absorbs heat with the temperature changing continually from $T_0-T_k$ (storing air energy), the corresponding side (air to be refrigerated) is area II: process 2-J-1 is a process in which the air to be refrigerated releases heat with the temperature changing continuously from $T_k-T_0$.

Area III: process 3-J-4 is a process in which the refrigeration working substance pair releases heat with the temperature changing continuously from $T_3-T_4$; the corresponding area is area IV: process 4-J-3 is a process in which the condensation air continuously changes its temperature from $T_4-T_3$ and absorbs heat under wet condition.

2-3 is the process of the adiabatic pumping from the high temperature to low temperature.

4-1 is the process of adiabatic expansion.

The area of $A_{1J4}$ is the work $W_1$ needed by the refrigeration cycle; while that of $A_{2J3}$ is the air energy $W_2$ obtained in the refrigeration cycle, the $W_2$ is the useful net work. The point J is the series connection point of the refrigerator and the air energy engine.

The work to be compensated for in the refrigeration cycle is $W_1-W_2=\Delta W$.

The thermodynamic performance coefficient $$EER = \frac{QM}{\Delta W_1}$$

where Qm is the refrigeration capacity.

When $W_2 \geq W_1$, it may automatically operate with the help of air energy $W_2$; at that time, EER→∞.

When the cold valley temperature $T_0$ lowers, the $T_4$ also comes downwards so does the point J, $W_1$ and $W_2$ increase simultaneously, $\Delta W=W_1-W_2$ does not increase, it can be seen that the figure 8-form cycle, during the refrigeration process which consumes work, can acquire air energy $W_2$ at the same time. The figure 8-form for the cycle is named according to the slanting 8 shape in the TS chart (FIG. 1).

Figure 2:
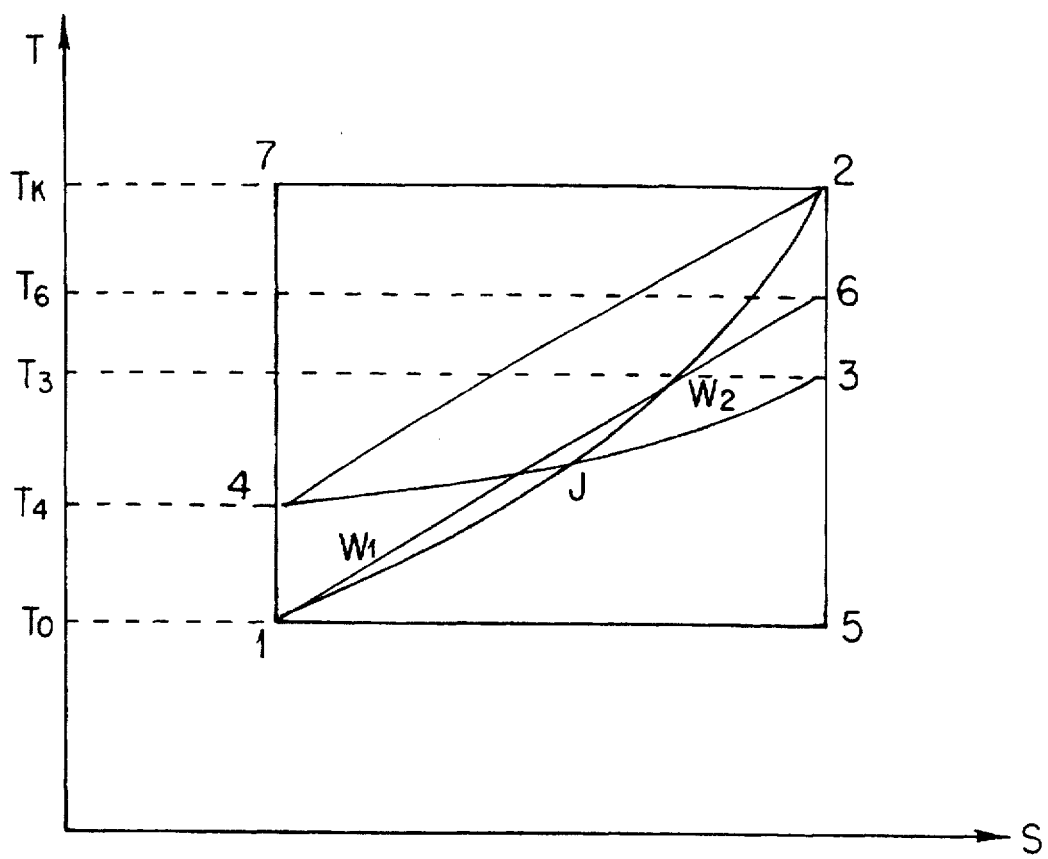
FIG. 2 shows the TS comparison chart among the ideal Carnot cycle, Lorentz cycle and figure 8-form cycle.

FIG. 2 represents the TS comparison chart of the ideal Carnot cycle and the Lorentz cycle with the figure 8-form cycle.

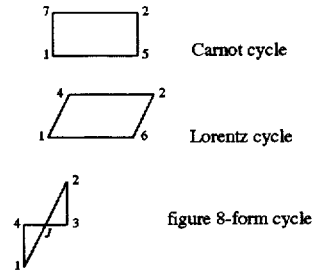

Carnot cycle

Lorentz cycle figure 8-form cycle

Under the same $T_k$ and $T_0$ conditions, the Carnot cycle consumes the maximal amount of work, but with minimum refrigerating capacity; the figure 8-form thermodynamic cycle features maximal refrigerating capacity with minimum work consumed; the Lorentz cycle ranks between the former two. The greater the temperature difference between $T_k$ and $T_0$, the more apparent is the foresaid comparison gap.

The process of heat transfer of J-pipe is a satisfying infinite differential and non-isothermal process, the heat transfer temperature difference to the end point is asymptotic to zero. Reasonably, both processes 1-J-2 and 3-J-4 can be considered as a reversible and continuous temperature-changing process. The figure 8-form thermodynamic cycle is composed of two reversible and continuous temperature-changing processes and two isentropic processes.

The Preferred Embodiments of the Invention

Please refer to FIG. 3: $J_1$ being the air energy heat pump J-pipe, $J_2$ being the supercondensation J-pipe, M being the energy transfer heat pump with low pressure difference, 13 being liquid vapor conveying pipe, 16 being the liquid conveying pipe, 17 being the throttle valve, 3 being the working substance distributing pipe, 4 being the washer, 5 being the heat conducting strip, 6 being the membrane type evaporating surface, 7 being corrugated heat conducting strip, 8 being the clamp plate, 9 being water accumulating tray, 10 being the water receiving tray, 11 being the return pipe, 12 being the supply air fan, 14 being the outlet air regulating window blade, 18 being the nozzle, 19 being the exhaust air fan, 20 being the $dx_n$ differential adiabatic piece, 21 being the $dy_n$ differential adiabatic piece.

In $J_1$, the heat exchange between the fluids of the refrigerating working substance and the air to be refrigerated goes on the plane-shaped metallic heat conducting strip 5. The corrugated $d_x$ differential adiabatic piece 2 made by non-metallic material places in between two plane-shaped metallic heat conducting strips 5 to form the working substance $dx_n$ flow channel. The inlet and outlet of $dx_n$ flow channel is, respectively, the working substance distributing pipe 3. On the working substance distributing pipe 3 there are holes leading to the $dx_n$ flow channel. The working substance distributing pipe 3 at the inlet connects with the liquid conveying pipe 16 leading into the throttle valve 17, while at the outlet the pipe 3 connects with the liquid vapor conveying pipe 13 leading into the inlet of M. The turning place for $dx_n$ flow channel is the return pipe 11. Another side of the heat conducting strip 5 clamps the corrugated heat conducting strip 7 to form a $dy_n$ flow channel for the air to be refrigerated. The fluids in $dx_n$ and $dy_n$ flow channel operate with vertical crossover in the two sides of the heat conducting strip 5. $J_1$ consists of the alternate pile of the $dx_n$ and $dy_n$ flow channels, and fastened in the frame made of clamp plate 8. At the outside two ends of each $dx_n$ flow channel there is the long strip washer 4.

In $J_2$, the heat exchange between the fluids of the refrigerating working substance and cooled air goes on the plane-shape metallic heat conducting strip 5. The wave $dx_n$ differential adiabatic piece 20 made of non-metallic material is clamped by the adjoining two heat conducting strips 5 to form $dx_n$ flow channel of working substance. At the outlet and inlet of the $dx_n$ flow channel there is the working substance distributing pipe 3, on which there are holes leading to the $dx_n$ flow channel. The working substance distributing pipe 3 at the inlet connects with the liquid vapor conveying pipe 13 leading to the M outlet, while at the outlet the pipe 3 connects with the liquid conveying pipe 16 leading to throttle valve 17. Another side of the plane-shaped heat conducting strip 5 adheres the membrane type evaporating surface 6 composed by porous water-absorbing material. The wave $dy_n$ differential adiabatic piece 21 composed by non-metallic material is clamped by the adjoining two membrane type evaporating surfaces 6 to form a $dy_n$ flow channel of the cooled air. The fluids (refrigerating working substance and cooled air) of the $dx_n$ and $dy_n$ flow channels operate at the two sides of heat conducting strip 5 with the vertical crossover. It is formed $J_2$ for $dx_n$ flow channel and $dy_n$ one to pile alternately each other, and fastened in the frame made of the clamp plate 8. At the outside two ends of each $dx_n$ flow channel there is the long strip washers 4.

The inlet of M connects with the liquid vapor conveying pipe 13 leading to the outlet of the $dx_n$ flow channel of $J_1$ with working pressure $P_1$, while the outlet connects with the liquid vapor conveying pipe 13 leading to the inlet of $dx_n$ flow channel of $J_2$ with working pressure $P_2$. The liquid conveying pipe 16 connected with outlet of $dx_n$ flow channel of $J_2$ leads to the throttle valve 17. The weak solution working substance pair $g_1$ throttles and decompresses to $P_1$ from $P_2$ and via the liquid conveying pipe 16 leads to inlet of $dx_n$ flow channel of $J_1$.

The left side of $J_1$ is the supply air fan 12, the right is the outlet air regulating shutter 14, the bottom is the water receiving tray 10. The right side of $J_2$ is the exhaust air fan 19, the left are the nozzles 18, the bottom is the water accumulating tray 9. The water receiving tray 10 connects with the water accumulating tray 9 by a water line. The water in the water accumulating tray 9 is controlled by the automatic supply water equipment.

The outdoor air $a_1$ with hot-valley temperature $T_k$, under the action of the supply air fan 12 at the left side of $J_1$, releases heat to $a_3$ with a cold valley temperature $T_0$ along the direction of $a_2$ in $dy_n$ flow channel changing temperature and through the guidance of the outlet air regulating shutter 14 inputs to the indoor. The weak solution $g_1$ composed of absorbent i and refrigerant x with pressure $P_2$ decompresses to $P_1$ with isenthalpic throttling from the liquid conveying pipe 16 via the throttle valve 17 and flows to the inlet of $dx_n$ flow channel of $J_1$ and evenly distributes each working substance distributing pipe 3 by liquid conveying pipe 16 and then sprays into $dx_n$ flow channel from the small holes.

Along the direction of $g_1 \rightarrow g_{12} \rightarrow g_2$, $g_1$ the working substance is heated gradually from $T_0$ to $T_k$ to become the strong absorbent solution $i_2$ and gasiform refrigerant $x_2$ with the superheat temperature $T_k - T_0 = \Delta T$ and then gather together in the liquid vapor conveying pipe 3 at the outlet of the $dx_n$ flow channel. After increasing pressure from $P_1$ to $P_2$ by M, it flows into the working substance distributing pipe 3 at the inlet of $dx_n$ flow channel of $J_2$ and sprays to each $dx_n$ flow channel from the small holes on the working substance distributing pipe 3 and along the direction of $g_2 \rightarrow g_1$ from $T_3$ gradually condenses the liquid weak solution $g_1$ with $T_4$ and then flows together to liquid conveying pipe 16 from the small holes on the working substance distributing pipe 3 at the outlet of the $dx_n$ flow channel. After decreasing pressure to $P_1$ with isenthalpic throttling via the throttle valve 17, it flows to the inlet of $dx_n$ of flow channel of $J_1$. The working substance cycle is done as such. The indoor air $a_4$ with the wet bulb temperature $T_4$, under the action of the exhaust air fan 19 at the right, absorbs moisture and heat along $a_4 \rightarrow a_5$ direction in the $dy_n$ flow channel of $J_2$ and becomes $a_6$ with wet bulb temperature $T_3$ then discharges to the atmosphere.

The condensation water of the $J_1$ refrigerating process flows into the water accumulating tray 9 at the $J_2$ bottom from the water line connected with water receiving tray 10 of the $J_1$ bottom and is sprayed on the windward face of $J_2$ from the nozzles 18 at the right by the water pump 23 at intervals and in a fixed amount, making the membrane type evaporating surface 6 moisten. The water in the water accumulating tray 9 is controlled by the automatic supply water equipment.

The heat pump feature of $J_1$ is manifested on: the condensation of $g_2$ and the strong superheat of $x_2$, store the energy of the air to be refrigerated in the endothermal process of $T_0 - T_k$. The membrane type evaporating surface 6 in $J_2$ is made of a porous water absorbing material. Under the wet condition, it possesses a good water-carrying and water-absorbing capability and larger evaporating surface area, and has very strong cooling and heat-conducting performance. The indoor air $a_4$ is a complete wet heat-absorbing process in $dy_n$ flow channel. From $T_4$ to $T_3$ the temperature rise is smaller, another aspect the temperature $T_4$ is also lower.

The surface partial pressure of the strong solution $g_2$, under a condensed state of $T_3 - T_4$ with lower temperature, is much lower than $P_2$. It makes $P_2$ present lower valve having strong ability of absorbing gasiform refrigerant $X_2$ and the ability to make it liquefy and release heat. Thus, the super-condensation feature of $J_2$ is shown in two respects: low temperature and low pressure condensation. It can be seen that a negative pressure engine used air as power that exists in the $dx_n$ flow channel of $J_2$.

Next, heat transfer temperature difference of $J_1$ is comparatively small, which the $P_1$ value obtained cold valley temperature $T_0$ of necessity is comparatively high. So the operating pressure difference $P_2 - P_1 = P$ of M is comparatively small. Therefore the figure 8-form machine features not only excellent thermodynamically perfect degree but also a high thermodynamic cycle efficiency.

FIG. 4 is the TS comparison chart among the figure 8-form machine in which

working substance is composed of absorbent and refrigerant, the Carnot refrigerator in which

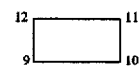

the working substance is composed of an azeotropic or single refrigerant and the Lorentz refrigerator in which

the working substance is a non-azeotropic mixed refrigerant.

FIG. 5 is the comparison chart of the corresponding pressure-enthalpy PH. The present marketed Carnot and Lorentz refrigerators (excluding large air-conditioners) all adopt an air-cooling condenser and an air-cooling evaporator. As the condensing temperature of the air-cooling condenser is 13°–15° C. higher than the outdoor ambient temperature and the evaporating temperature of the air-cooling evaporator is 8°–12° C. lower than the temperature of the outlet cold wind while the heat-transfer temperature difference of J pipe of the figure 8 form machine is 0.1°–0.5° C. With the prerequisite of the same cold wind output temperature and the same ambient temperature $T_k$; the condensing temperature of both Carnot and Lorentz refrigeration is higher than $T_k$ and their condensing pressure is higher than $P_2$, while their evaporating temperature is lower than $T_o$ and the evaporating pressure is lower than $P_1$. It can be seen from the comparison of FIG. 4 and FIG. 5 that in the actual refrigerating system, the higher the condensing pressure, and the lower the evaporating temperature, the more work is consumed, quite the contrary, the smaller refrigerating capacity will be smaller.

Assuming that the work consumed by the Carnot refrigerator is $W_c$, refrigerating capacity $Q_c$, $EER_c$. Work by the Lorentz refrigerator being $W_L$, refrigerating capacity $Q_L$, $EER_L$. Work consumed by the figure 8-form machine being $W_M$, refrigerating capacity $Q_M$, $EER_M$.

∴ $W_c > W_L > W_M$ while $Q_M > Q_L > Q_c$

∴ $EER_M > EER_L > EER_c$

The figure 8-form machine possesses a higher air-absorbing superheat temperature, this part of heat results in the temperature rise of the absorbent, therefore, the figure 8-form machine must select an absorbent with large heat capacity and a high heat conducting coefficient; as well as higher subcooling temperature (resulting from the supercondensation effect), therefore the refrigeration capacity $Q_M$ will be much larger than $Q_c$ and $Q_L$. With a lower EER value, Carnot and Lorentz refrigerators cannot use 100% fresh air while for figure 8-form machine, only with 100% fresh air can it demonstrate optimal thermodynamic cycle efficiency.

With reference to FIGS. 3 and 6, when $J_1$ is used as an indoor machine and $J_2$ as an outdoor one, the air to be refrigerated of $J_1$ is the closed circulating air current of the indoor air; the condensed air of $J_2$ absorbs from and discharges to the outdoor (corresponding to the preset separating-type air-conditioner). At that time, the T-S chart of the figure 8-form machine changes to be the π-form T-S cycle chart of FIG. 6 (π-form machine called for short).

$T_2$ being the dry bulb temperature of indoor air.

$T_S$ being the wet bulb temperature of outdoor air.

$T_3$ being the discharge wet bulb temperature of $J_2$.

$T_0 = T_1$ being the cold valley temperature also the discharge cold wind temperature of $J_1$.

When the π-form machine is the practical operation, $T_2$ is variable. When $T_2 = T_3$, point J and points $T_2$, $T_3$ overlap the same point, $W_2 = 0$. When $T_3 > T_2$, the point J disappears. The π-form machine and the figure 8-form machine are of a same system and are composed to two reversible continuous temperature-changing processes, an adiabatic pumping one and an isenthalpic throttling one.

Given the figure 8-form machine and the π-form machine are of the same cold valley temperature $T_0$.

Because:

$T_2 < T_K$, $T_K$ being the outdoor ambient temperature.

$T_S > T_4$, $T_4$ being the indoor air wet bulb temperature.

That is to say, the π-form machine's hot valley temperature is lower than that of the figure 8-form machine, its condensing temperature is higher than the figure 8-form machine, therefore the air energy amount $W'_2$ obtained by the π-form machine in the course of refrigeration is less than that of the figure 8-form machine. The work $W'_M$ supplied to the system by the π-form machine M must be larger than the work $W_M$ required by the figure 8-form machine. But the π-form machine can also store air energy in the refrigerating process which consumes energy, the heat pump nature of $J_1$ and supercondensation of $J_2$ still exist and have a less irreversible loss in the heat transfer course, thereby possessing higher thermodynamic cycle efficiency and EER value.

The figure 8-form machine can be made into window type air-conditioner. FIG. 7 is a window-type figure 8-form machine. With reference to FIG. 7, the portion above the center line is $J_1$ (air energy heat pump J pipe), below the center line is $J_2$ part (supercondensation J-pipe). 22 being the water filter, 23 being the water pump, 24 being the electromagnetic control valve, 25 being the J-pipe clamp board, 26 being the heating nozzle, 27 being the return board, 28 being the exhaust air regulating shutter, 9 being the water accumulating tray. Other reference numerals are same with the reference numerals in the FIG. 3. The J-pipe clamp board is used for assembly.

Refer FIG. 7 the window type figure 8-form machine. $J_1$ is set above the center line, $J_2$ is set below the center line. $J_1$ and $J_2$ are clamped in the frame by three J-pipe clamp boards at the over, the middle and the under. The return boards 27 of $J_1$ and $J_2$ are employed to separate $dx_n$ flow channel of $J_1$ and $J_2$, making the refrigerating working substance pair flow with a U-form in the J-pipe. The right side of $J_1$ is the supply air fan 12, the left side is the outlet air regulating shutter 14. The right side of $J_2$ is the exhaust air fan 19, the left side is the exhaust air regulating shutter 28. The water accumulating tray 9 is set at the bottom and is employed as a chassis. M joined to $J_1$ and $J_2$ is set in the chassis. The lead out water line of water pump 23, installed in the chassis, connects with the electromagnetic control valve 24, the lead in water line connects with the water filter 22. The electromagnetic valve 24 connects with the water line which leads into the nozzle 18 at the left side of $J_2$ and the heating nozzle 26 at the left side of $J_1$ and the right side of $J_2$. The condensation water of $J_1$ flows into the water accumulating tray 9. The water in the water accumulating tray 9 is controlled by the automatic supply water equipment.

The outdoor natural air, driven by the supply air fan 12, goes through the $dy_n$ flow channel of $J_1$ and releases heat to $a_3$ of cold valley temperature $T_0$, then inputs the indoor; with the drawing and suction function of the exhaust air fan 19 and the guidance of air outlet regulating shutter 14, the indoor air $a_4$ extracts humidity and heat from the membrane type evaporating surface 16 in the $dy_n$ flow channel of $J_2$ and discharges to the atmosphere in an $a_6$ state. The return boards 27 of $J_1$, $J_2$ are employed to separate $dx_n$ flow channel, making its working substance pair flow with a U-form in the J-pipe.

During refrigeration, the nozzle 18 sprays the fog in fixed time and amount to the membrane type evaporating surface 16 of $J_2$ and in time wets it. The water pump 23 sends water at regular intervals to the electromagnetic control valve 24 which in turn supplies water to the nozzle 18 during refrigeration and provides water to the heating nozzle 26 during heating. The water filter 22 can prevent impurities from entering the water supply system.

While the figure 8-form machine is in heating (heat pump): $J_1$ is still the air energy heat pump J-pipe, only turning the cold valley to the outdoor; $J_2$ is still the supercondensation J-pipe but the hot valley formed by $J_2$ is to be turned into the room, the following changes are to be made:

1. To switch simultaneously the inlets of the refrigerating working substance of $J_1$, $J_2$ to outlets, the outlets to inlets, making the working substance pair go in reverse direction.

2. To have the supply air fan 12 operate in reverse and become a discharge fan to exhaust air from the indoor to outdoor, the indoor air releases, through $dy_n$ flow channel of $J_1$, heat to cold valley temperature and discharges to the atmosphere.

To have the exhaust air fan 19 operate in reverse and become a supply air fan, the outdoor fresh air absorbs, through the $dy_n$ flow channel of $J_2$, heat and moisture to hot valley temperature and is sent into the room.

3. Under the action of the electromagnetic control valve 24 and the water pump 23, the heating nozzle 26 at the left side of $J_1$ and right side of $J_2$ sprays fog at intervals to $J_1$ and $J_2$ to wet the membrane type evaporating surface 6 of $J_2$ and to timely defrost the frost accumulated in the $dy_n$ flow channel of $J_1$. Appropriate amount of glycerin or glycol solution is to be added into the water accumulating tray 9 to enhance the heat-exchange performance of $J_1$ and $J_2$ and prevent the $dy_n$ flow channel of $J_1$ from forming freeze-up.

As the heat transfer temperature difference of J-pipe of the figure 8-form machine and π-form machine is smaller moreover the condensation temperature is relatively low and so is the temperature rise. Even if they are used as Lorentz cycle of a non-azeotropic mixed working substance and Carnot cycle of azeotropic mixed working substance or single working substance, it also possesses a relatively strong thermodynamic preponderance and can make the EER value increase 2–3 times, as compared with the current commercially available air conditioners.

What is claimed is:

1. A refrigeration apparatus comprising a working fluid, a heat pump pipe for said working fluid, a supercondensation pipe for said working fluid, a low pressure difference energy transfer pump for pumping said working fluid through said pipes, a liquid vapor conveying pipe coupled to said low pressure difference pump for said working fluid, a throttle valve coupled to said liquid conveying pipe for isenthalpic throttling of said working fluid, a distributing pipe for said working fluid coupled to said energy transfer pump, at least one heat conducting strip for the working fluid, an air supply fan for supplying air to the apparatus and said heat conducting strip, whereby the working fluid absorbs heat with the temperature changing continually from a low temperature to a high temperature, the air to be refrigerated releases heat with the temperature changing continuously from said high temperature to said low temperature in which the temperature and enthalpy relationship of the air supplied by said fan follows a canted figure-8 configuration as the air is processed through the apparatus.

* * * * *

UNITED STATES PATENT AND TRADEMARK OFFICE
CERTIFICATE OF CORRECTION

PATENT NO. : 5,775,114
DATED : July 7, 1998
INVENTOR(S) : Aming Ji

It is certified that error appears in the above-identified patent and that said Letters Patent is hereby corrected as shown below:

On the title page:

Item [30]:

In the part "Foreign Application Priority Data":

Change "[CH] Switzerland" to --[CN] China--;

In the part "Primary Examiner":

Change "Caposseia" to --Capossela;

Column 7, line 12, remove a dot after "C" abbreviation;

Signed and Sealed this

Thirteenth Day of June, 2000

Attest:

Q. TODD DICKINSON

Attesting Officer　　Director of Patents and Trademarks